United States Patent [19]
Kawashima

[11] Patent Number: 5,640,574
[45] Date of Patent: Jun. 17, 1997

[54] PORTABLE COMPUTER APPARATUS HAVING A DISPLAY CAPABLE OF DISPLAYING POWER MANAGEMENT INFORMATION AND METHOD OF CONTROLLING THE DISPLAY

[75] Inventor: Toshihiko Kawashima, Kawasaki, Japan

[73] Assignee: Canon Kabushiki Kaisha, Tokyo, Japan

[21] Appl. No.: 265,147

[22] Filed: Jun. 24, 1994

[30] Foreign Application Priority Data

Jun. 30, 1993 [JP] Japan ................... 5-183276

[51] Int. Cl.⁶ .................................. G06F 1/28
[52] U.S. Cl. ........................... 395/750; 178/87
[58] Field of Search ............ 395/750; 364/707; 178/87

[56] References Cited

U.S. PATENT DOCUMENTS

| | | | |
|---|---|---|---|
| 4,984,185 | 1/1991 | Saito | 364/707 |
| 5,133,076 | 7/1992 | Hawkins et al. | 395/800 |
| 5,167,024 | 11/1992 | Smith et al. | 395/375 |
| 5,241,303 | 8/1993 | Register et al. | 340/706 |
| 5,341,503 | 8/1994 | Gladstein et al. | 395/750 |
| 5,423,045 | 6/1995 | Kannan et al. | 395/750 |

*Primary Examiner*—Glenn A. Auve
*Attorney, Agent, or Firm*—Fitzpatrick, Cella, Harper & Scinto

[57] ABSTRACT

In a portable computer apparatus, if an operation mode, designated by an input operation of a mode change switch 4 of a pen device, is changed from a user program mode to a power management mode when a program using data in a user program area of the VRAM is executed by the main CPU, power management data is developed while a first arbiter arbitrates between access from a display control section and a main CPU to a VRAM, and while a second arbiter 8 arbitrates access from a sub CPU to a power management area of the VRAM.

15 Claims, 10 Drawing Sheets

| MODE | MAIN CPU | DIGITIZER CONTROLLER OUTPUT | DISPLAYED VRAM AREA | OPERATION PERFORMED BY USER |
|---|---|---|---|---|
| USER PROGRAM MODE | EXECUTION OF USER PROGRAM | INPUT TO CHIP SET | USER PROGRAM AREA | DEPENDING UPON USER PROGRAM |
| POWER MANAGEMENT INFORMATION MODE | EXECUTION OF USER PROGRAM | INPUT FOR POWER MANAGEMENT | POWER MANAGEMENT AREA | CHANGING POWER MANAGEMENT INFORMATION AND THE LIKE |

| MODE | MAIN CPU | DIGITIZER CONTROLLER OUTPUT | DISPLAYED VRAM AREA | OPERATION PERFORMED BY USER | RECOGNITION ROUTINE/ RECOGNITION DICTIONARY ROM |
|---|---|---|---|---|---|
| USER PROGRAM MODE | EXECUTION OF USER PROGRAM | INPUT TO CHIP SET | USER PROGRAM AREA | DEPENDING UPON USER PROGRAM | ONLY MAIN CPU ACCESSED |
| POWER MANAGEMENT INFORMATION MODE | EXECUTION OF USER PROGRAM | INPUT FOR POWER MANAGEMENT SUB CPY | HANDWRITTEN CHARACTER INK DATA IN POWER MANAGEMENT AREA AND DISPLAY INFORMATION IN USER PROGRAM AREA SUPERPOSED ON EACH OTHER | POWER MANAGEMENT INFORMATION | SUB CPU ALSO ACCESSIBLE |

FIG. 10

⇨ OPERATION PROCEEDS INTO SUSPENSION MODE WHEN POWER MANAGEMENT MODE IS INPUT

FIG. 11

| INPUT HANDWRITTEN CHARACTERS | POWER MANAGEMENT INFORMATION TO BE INPUT |
|---|---|
| B30S | ESTABLISHING CPU STANDBY IF IDLING CONTINUES FOR 30 SEC. |
| PIM | ESTABLISHING SUSPENDED STATE IF IDLING CONTINUES FOR 1 MIN. |
| SP | ESTABLISHING SUSPENDED STATE IMMEDIATELY |
| OFF | POWER OFF |
| L1 | BACKLIGHT ON |
| L0 | BACKLIGHT OFF |
| FG | REMAINING DATA DISPLAY ON/OFF |

```
┌─────────────────────────────────────────────────────────────┐
│              POWER MANAGEMENT CONTROL                        │
├─────────────────────────────────────────────────────────────┤
│                                                             │
│  CPU STANDBY      1Minute      HDD OFF          1Minute     │
│  CPU SUSPEND      40Seconds    BACKLIGHT OFF    2Minute     │
│  LOW BATTERY      DISABLE                                   │
│     SUSPEND                                                 │
│  RESUME BY        ENABLE                                    │
│     MODEM RING                                              │
│  SUSPEND NOW                                                │
│                                                             │
│  BATT POWER       85%                           ┌─────┐     │
│                                                 │EXIT │     │
│                                                 └─────┘     │
└─────────────────────────────────────────────────────────────┘
```

FIG. 16
PRIOR ART

PORTABLE COMPUTER APPARATUS HAVING A DISPLAY CAPABLE OF DISPLAYING POWER MANAGEMENT INFORMATION AND METHOD OF CONTROLLING THE DISPLAY

BACKGROUND OF THE INVENTION

1. Field of the Invention

This invention relates to a portable pen-input computer apparatus capable of operating by power from a battery power source.

2. Description of Related Art

Figure 14:
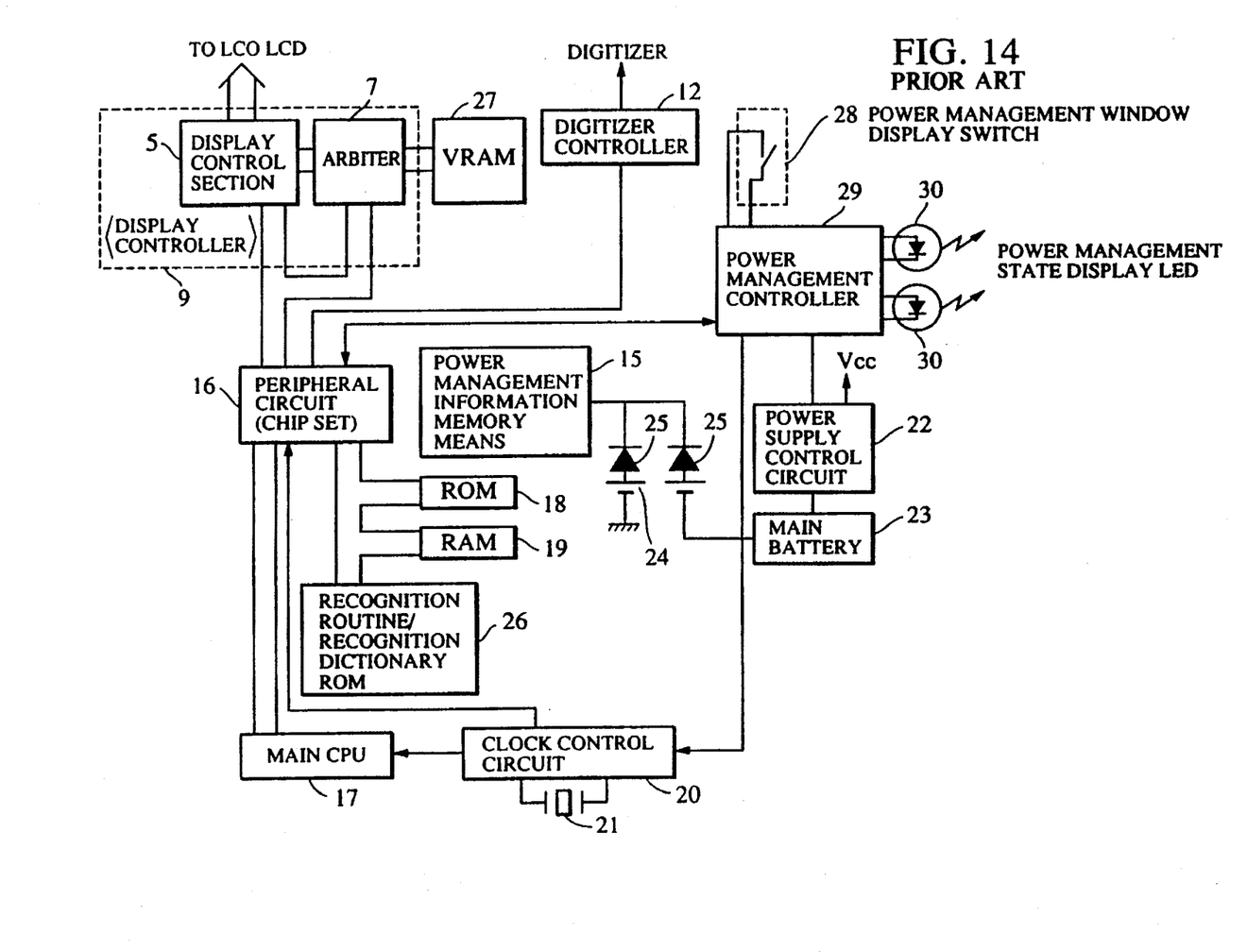
FIG. 14 is a block diagram of a control system of a conventional portable pen-input computer apparatus.

Portable pen-input computer apparatuses capable of operating by power from a battery power source, typically portable pen-input computer apparatuses having a compatibility with the software for the PC/AT series of IBM Corp., are arranged as shown in FIG. 14.

FIG. 14 is a block diagram of a control system of such a conventional pen-input computer apparatus.

A block 9 in FIG. 14 represents a display controller for controlling a display means such as a liquid crystal display (LCD), which is ordinarily a unit called VGA or EGA (registered trademark of IBM). The display controller 9 mainly consists of a display control section 5 and an arbiter 7 for preventing a conflict between an access from a CPU to a VRAM 27 and an access from the display control section 5 (readout). A block 16 represents a peripheral circuit 16 (ordinarily called a chip set) in which an interrupt controller, a direct memory access (DMA) controller, a dynamic random access memory (DRAM) controller and various registers are incorporated by being arranged in accordance with the architecture of the PC/AT series. A block 17 represents a main central processing unit (CPU) for controlling processing of user programs and the like, a block 18 a read only memory (ROM) for storing a basic input output system (BIOS) or the like, and a block 19 a random access memory (RAM) for storing user programs and various kinds of data. A block 12 represents a digitizer controller 12 which controls a digitizer and which transmits detected coordinate data to the main CPU 17. A block 20 represents a clock control circuit for supplying clock to the main CPU 17 and the chip set 16. The clock control circuit 20 has a function of reducing the clock or stopping the clock (for standby) by an instruction from a power management controller 29. An oscillator 21 is connected to the clock control circuit 20 to effect original oscillation of the clock of the clock control circuit 20. A block 22 represents a power supply control circuit for controlling the supply of power to sections or components of the portable pen-input computer apparatus, a block 23 a main battery which is a power source for the pen-input computer, and a block 24 a sub battery provided as a power source for maintaining the memory content of the power management information memory means 15 even if the main battery is removed or the battery energy is dissipated. Switching diodes 25 are provided between the power management information memory means 15 and the main and sub batteries to switch the power supply to the power management information memory means 15. The system also includes a ROM 26 for storing a handwriting recognition routine and a recognition dictionary, a power management window display switch 28 for starting power management processing during the execution of an application program, a power management controller 29 for controlling the power supply for the portable pen-input computer apparatus, and light emitting diode (LED) indicators 30 for indicating the state of the batteries and the state of the CPU operating clock. The operation of changing power management parameters will be described with reference to FIGS. 15 and 16.

Figure 15:
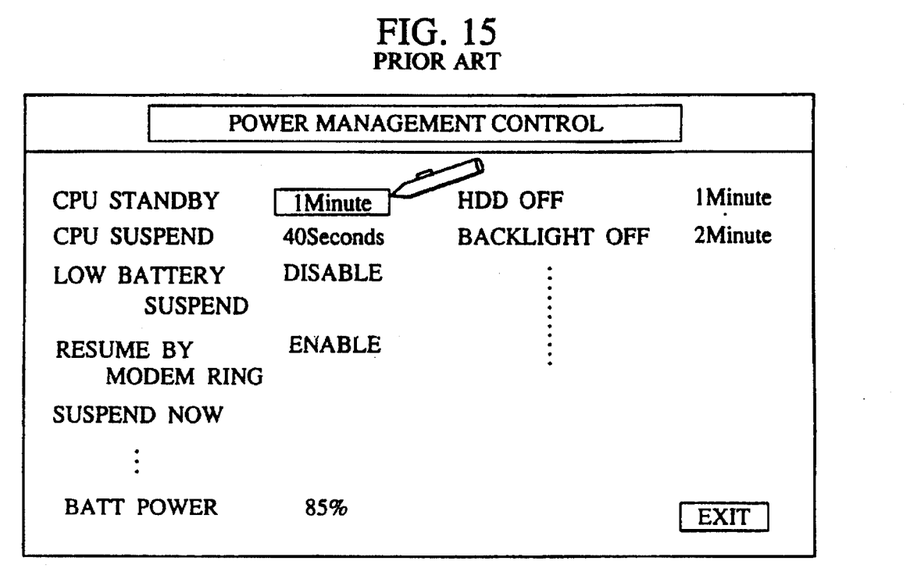
FIG. 15 is a diagram of an example of a power management parameter change window in the conventional portable pen-input computer apparatus.
Figure 16:
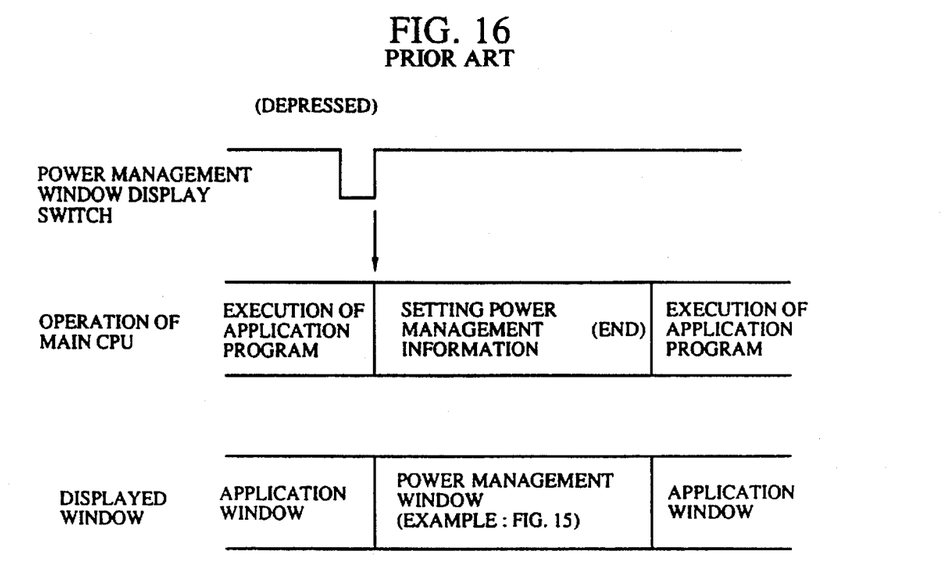
FIG. 16 is a timing chart of the operation of changing parameters for power management in the conventional portable pen-input computer apparatus.

FIG. 15 is a diagram showing an example of a power management parameter change window in the conventional portable pen-input computer apparatus. FIG. 16 is a timing chart for explaining the power management parameter change operation in the conventional portable pen-input computer apparatus.

A parameter of power management, for example, with respect to the stoppage of the CPU clock or the operation of turning off the power supply to a peripheral unit consuming a large amount of power, such as a hard disk (HD) or a display backlight, may be changed. As shown in FIG. 16, if a user wants to change an idling time before the CPU is set in a standby state (the CPU operating clock is stopped), i.e., a period of time through which the CPU is allowed to perform no processing while being supplied with the operating clock, and after the elapse of which the operating clock is stopped to set the CPU in a standby state, the power management window display switch 28, which is ordinarily provided on a casing of the pen-input computer, is then depressed to display a power management window such as that shown in FIG. 15, a necessary portion (for changing the time parameter of "CPU STANDBY" in this case) is touched with a pen to change the corresponding parameter, and "EXIT" is thereafter touched to return the operation to the execution of an application program.

Power management information on remaining battery power and other conditions is ordinarily displayed, for example, through a window specially provided for power management as shown in FIG. 15 or a special application program, or is displayed by using a medium such as an LED indicator.

The above-described conventional control system, however, entails problems described below in (1) to (3), since a power management display is made through a special display window, by the execution of a special application program or by using a special display medium (a separate LED indicator or the like).

(1) Each time the display of the special window or the execution of a special application program is made, an application program executed theretofore must be interrupted. Such an interruption may hinder user's thinking process or work.

(2) If a process in which a processing timing is very critical, e.g., a process in accordance with a processing communication program in synchronization with a timer, is being executed in a case as shown in (1), a situation may result where a software compatibility is impaired.

(3) If a power management display is made by using a special display medium such as an LED indicator, a space in which the medium is mounted is required as well as power supply to the medium. The important features of the portable pen-input computer apparatus, i.e., a small size, a light weight and low power consumption, are thereby reduced or impaired, resulting in a reduction in the commodity value.

SUMMARY OF THE INVENTION

In view of the problems of the conventional art, an object of the present invention is to provide a small portable computer apparatus capable of controlling conflicts between display accesses for a display of power management information and a display of the state of operation during the execution of a program to maintain a sufficiently long time for a display of power management information and for condition setting or the like without obstructing the program execution.

A display control means may be arranged to display on a display means both power management data and program codes stored in a display information memory means. It is possible to call user's attention to some power saving operation by informing the user of the power management data with such means during the execution of a program.

Also, a display control means may be arranged to alternately display on a display means power management data and program codes stored in a display information memory means. It is possible to positively call user's attention to some power saving operation by informing the user of the power management data with such means during the execution of a program.

Further, a display control means may be arranged to display on a display means power management data or program codes stored in a display information memory means. It is therefore possible to display the power management data or program codes without obstructing the user's program inputting operation.

Accordingly, another object of the present invention is to provide an improved computer apparatus having a user interface which ensures that power information management can be performed reliably in a main unit without being influenced by the compatibility of an executed program, that the power consumption for power management can be remarkably reduced, and that the battery drive time can be remarkably extended in comparison with the conventional art.

To achieve these objects, according to one aspect of the invention, there is provided a portable computer apparatus comprising input means for inputting commands, display mode designation means for designating a display mode, program execution means for performing processing by analyzing each command input by the input means, power management execution means for performing power management by detecting power information, first display information memory means for storing display information for displaying a result of execution of a user program by the program execution means, second display information memory means for storing display information for displaying a result of execution by the program execution means, display means for displaying display information stored in the first display information memory means and display information stored in the second display information memory means, and display control means for displaying the content of the first display information memory means and the content of the second display information memory means on the display means, if the display mode designated by the display mode designation means is changed from a user program mode to a power management mode while a user program is being executed by the program execution means.

The input means comprises pen means.

The display means may drive, by electric power, a touch panel constructed integrally with detection means for detecting coordinates designated with pen means.

The electric power may be supplied from a battery.

The display control means may display the content of the first display information memory means and the content of the second display information memory means on the display means by superposing the contents.

The display control means may alternately display the content of the first display information memory means and the content of the second display information memory means on the display means.

According to another aspect of the invention, there is provided a portable computer apparatus comprising input means for inputting commands, display mode designation means for designating display modes, program execution means for performing processing by analyzing each command input by the input means, power management execution means for performing power management by detecting power information, first display information memory means for storing display information for displaying the result of execution of a user program by the program execution means, second display information memory means for storing display information for displaying the result of power management performed by the power management execution means, and display means for displaying display information stored in the first display information memory means and display information stored in the second display information memory means, wherein the program execution means and the power management execution means execute a user program and perform power management processing by accessing a recognition routine/recognition dictionary based on a command input by the input means, if the display mode designated by the display mode designation means is changed from a user program mode to a power management mode when a user program is being executed by the program execution means.

The input means comprises pen means.

The display means may drive, by electric power, a touch panel constructed integrally with detection means for detecting coordinates designated with pen means.

The electric power may be supplied from a battery.

Display control means may be provided to display the content of the first display information memory means and the content of the second display information memory means by superposing the contents.

The development control means may alternately develop the content of the first display information memory means and the content of the second display information memory means on the display means.

According to still another aspect of the invention, there is provided a method of controlling a display in a portable computer apparatus capable of performing power management, the method comprising the steps of inputting commands to be processed in a user program, processing each input command by executing the user program, storing the result of the execution of the user program in a first memory, performing power management by detecting power information regarding the portable computer apparatus, storing information relating to the result of the power management step in a second memory, displaying information stored in the first memory and information stored in the second memory, if a display mode is changed from a user program mode to a power management mode during the execution of the user program.

According to a further aspect of the invention, there is provided a method of controlling a display in a portable computer apparatus capable of performing power management, the method comprising the steps of inputting commands to be processed in a user program, processing each input command by executing the user program, storing the result of the execution of the user program in a first memory, performing power management by detecting power information regarding the portable computer apparatus, storing information relating to the result of the power management step in a second memory, and executing the user program and performing power management processing by accessing a recognition routine/recognition dictionary with power management execution means on the basis of an input command, if a display mode is changed from a user program mode to a power management mode during the execution of the user program.

DESCRIPTION OF THE PREFERRED EMBODIMENTS

[First Embodiment]

Figure 1:
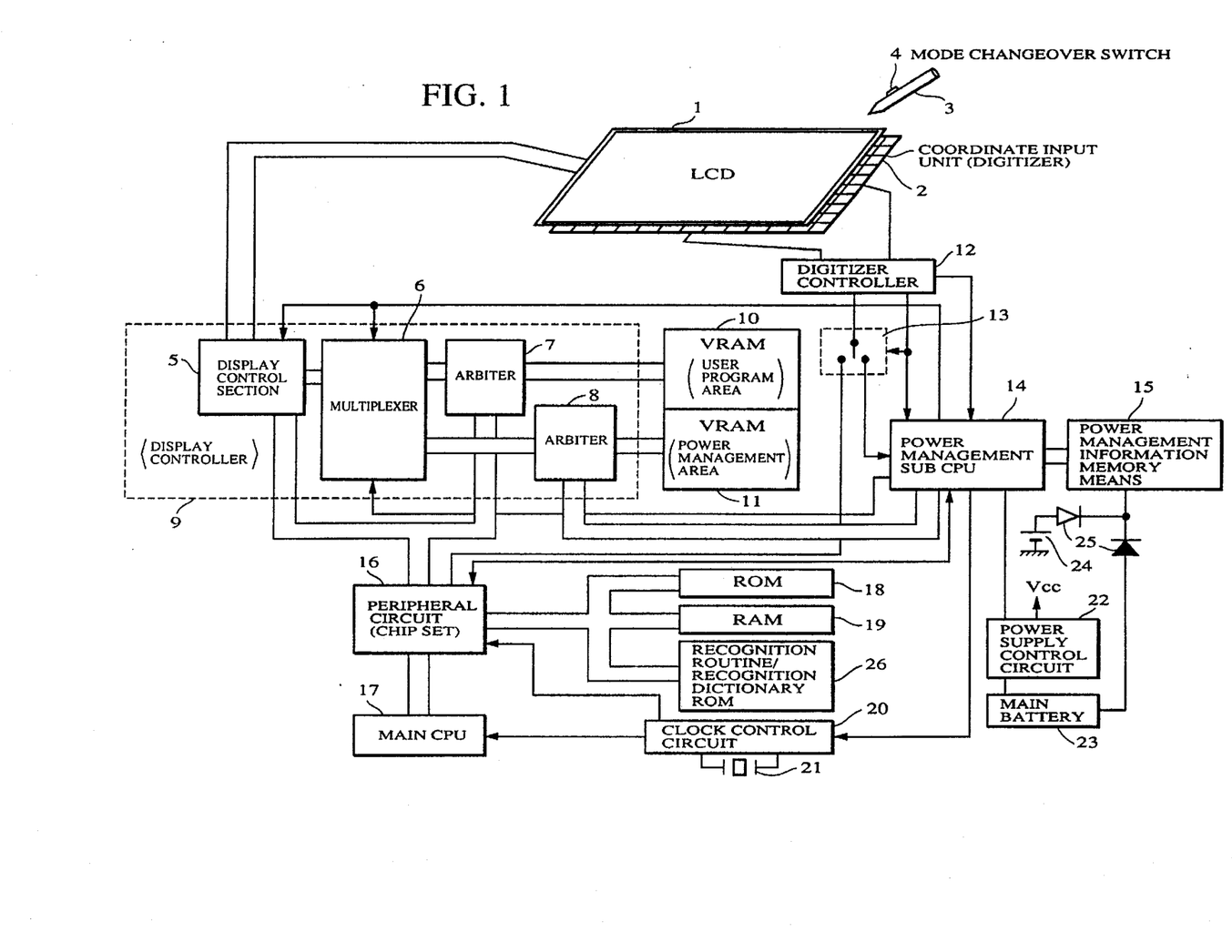
FIG. 1 is a block diagram of the construction of a portable pen-input computer apparatus in accordance with a first embodiment of the present invention.

FIG. 1 is a block diagram of the construction of a portable pen-input computer apparatus in accordance with a first embodiment of the present invention.

As shown in FIG. 1, the pen-input computer apparatus has a liquid crystal display (LCD) 1, and a coordinate input unit (digitizer) 2 for inputting coordinate information. If a desired coordinate position is designated with a pen 3 or the like on the coordinate input unit 2, the coordinate input unit 2 outputs corresponding coordinate information to a digitizer controller 12.

A mode changeover switch 4 is provided on the pen 3. The mode changeover switch 4 is depressed by a user to designate an operation mode change with respect to whether a signal from the digitizer 2 relates to the execution of a user program or power management. A display control section 5 generates LCD 1 control clock and a display data signal. A multiplexer 6 transmits the content in a user program area 10 of a VRAM and the content in a power management area 11 of the VRAM to the display control section 5 by arranging them in a superposed state or in parallel with each other, or by selectively transmitting one of them. An arbiter 7 sets the main CPU 17 in a wait state to prevent an access from the main CPU 17 to the user program area of the VRAM from conflicting with an access from the display control section 5. An arbiter 8 sets the power management sub CPU 14 in a wait state to prevent an access from the power management sub CPU 14 to the power management area of the VRAM from conflicting with an access from the display control section 5. A display controller 9 is constituted of the display control section 5, the multiplexer 6 and the arbiters 7 and 8, which are combined in, for example, a one-chip LSI.

The user program area 10 is maintained in the VRAM to store display information prepared in accordance with a user program, and the power management area 11 is also maintained in the VRAM to store display information relating to power management. The digitizer controller 12 scans two coordinate input units to detect input coordinate information, and controls a switch 13 to selectively output the detected coordinate information to the power management sub CPU 14 or the main CPU 17. The power management sub CPU 14 controls the execution of a power management program or the like. A power management information memory means 15 stores information relating to power management and the power management program. A peripheral circuit 16 ordinarily called a chip set is provided for the main CPU 17. The main CPU 17 controls the execution of application programs or the like. Application programs are stored in a ROM 18 and a RAM 19, or in floppy disk or a hard disk (not shown). The ROM 18 is connected to the main CPU 17 and ordinarily stores a BIOS or the like. The RAM 19 functions as a main memory. A clock control circuit 20 controls the frequency of a clock for the main CPU 17 on the basis of instructions from the power management sub CPU 14. An oscillator 21 is connected to the clock control circuit 20 to effect original oscillation of the clock. A power supply control circuit 22 controls the supply of power to devices of the portable pen-input computer apparatus on the basis of instructions from the power management sub CPU 14. A main battery 23 is provided as a power source for the portable pen-input computer apparatus. A sub battery 24 is provided to maintain the memory content of the power management information memory means 15 even if the main battery is removed or the battery energy is dissipated. Switching diodes 25 serve to switch the power supply from the main battery 23 and the sub battery 24 to the power management information memory means 15. A ROM 26 is provided to store a handwriting recognition routine and a recognition dictionary.

In the thus-constructed portable pen-input computer apparatus, if an instruction is input through the mode changeover switch 4 of the pen 3 to change the operation mode from a user program mode to a power management mode when a user program is being executed by the program execution means (main CPU 17), the power management sub CPU 14 starts accessing the power management area 11 of the display information memory means different from the user program area separately from the execution of the user program conducted by the program execution means, the arbiter 8 arbitrates between the access from the power management sub CPU 14 to the power management area 11 and an access from the display control section 5 to avoid a conflict therebetween, and power management data managed by power information management means is developed in the power management area set in the display information memory means. It is therefore possible to prevent a conflict between an access to the display information memory means made by the program execution means and an access to the display information memory means made by the power information management means.

The display control means (display control section 5) can display on the display means both power management data and program codes stored in the display information memory means. It is therefore possible to call a user's attention to some power saving operation by informing the user of the power management data during the execution of a program.

Further, the display control means (display control section 5) can alternately display on the display means power management data and program codes stored in the display information memory means. It is therefore possible to positively call the user's attention to some power saving operation by informing the user of the power management data during the execution of a program.

Also, the display control means (display control section 5) can display on the display means power management data or program codes stored in the display information memory means. It is therefore possible to display the power management data or program codes without obstructing the user's program inputting operation.

Figure 2:
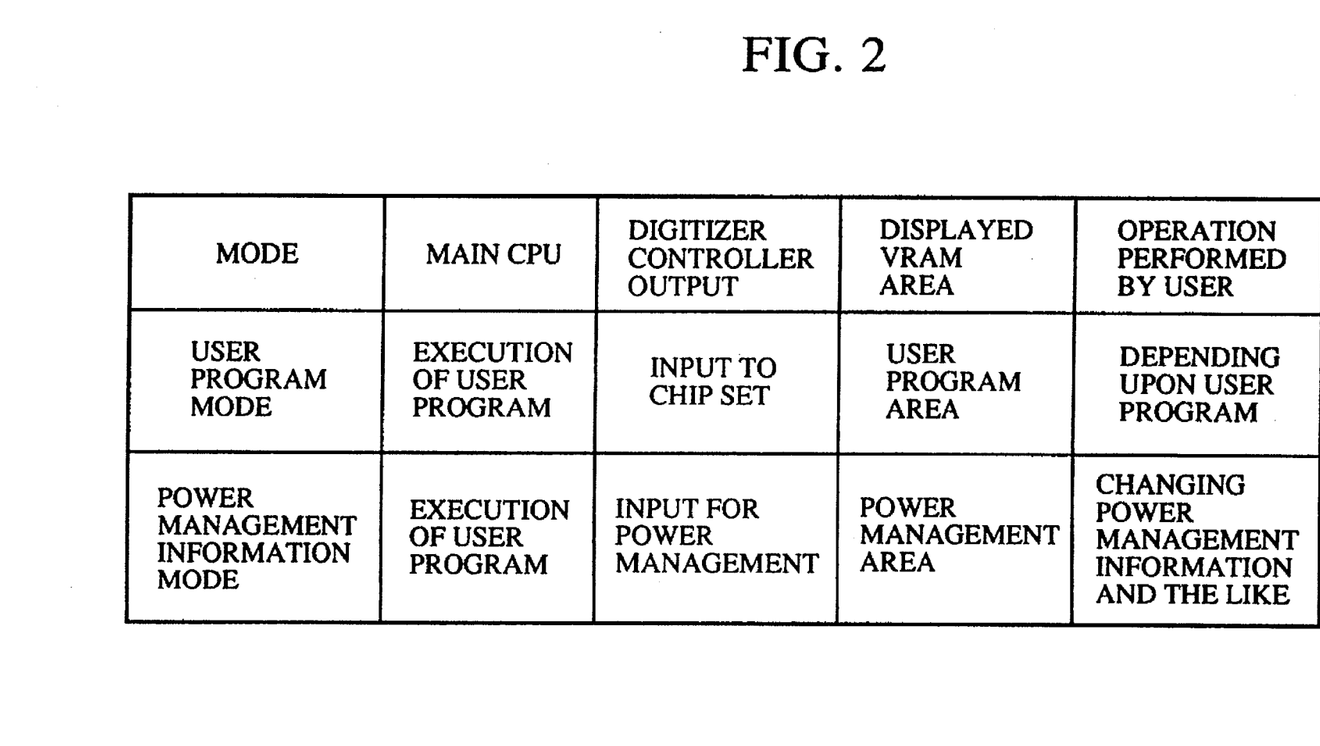
FIG. 2 is a diagram of operation modes of the portable pen-input computer apparatus shown in FIG. 1.

FIG. 2 is a diagram of the operation modes of the portable pen-input computer apparatus shown in FIG. 1.

As shown in FIG. 2, in "user program mode", the switch 13 is operated to connect the output from the digitizer controller 12 to a chip selection terminal, i.e., to the main CPU 17, and information stored only in the user program area is selectively displayed on the LCD 1.

In "power management information mode", the switch 13 is operated to connect the output from the digitizer controller 12 to the power management sub CPU 14 and information stored only in the power management area is selectively displayed on the LCD 1.

Figure 3:
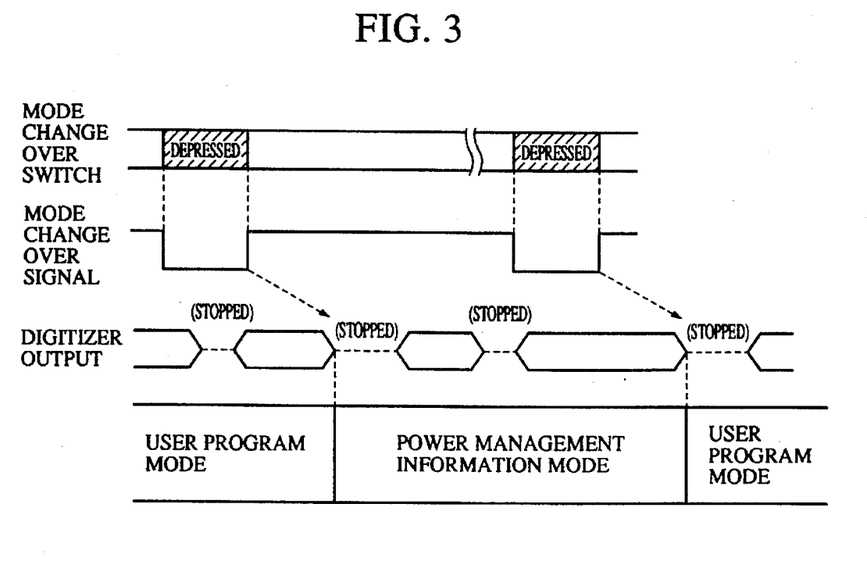
FIG. 3 is a timing chart of the operation of the portable pen-input computer apparatus shown in FIG. 1.

FIG. 3 is a timing chart for explaining the operation of the portable pen-input computer apparatus shown in FIG. 1.

As shown in FIG. 3, after the mode change switch 4 has been depressed by the user, the operation mode is changed alternately between "user program mode" and "power management information mode" at each of times when the output from the digitizer 2 is stopped (for example, times when the pen 3 is moved away from a proximity detection region).

Since the portable pen input computer apparatus of the present invention is arranged as described above, it is, of course, possible to change power management parameters and to confirm information relating to power management. Also, there is no need for the main CPU 17 in changing the parameters, because the power management information memory means 15 is directly connected to the power management sub CPU 14 and because the sub CPU 14 directly receives the signal from the digitizer 2. Therefore, as shown in FIG. 2, the main CPU 16 may operate only for the execution of a user program even in this mode. Accordingly, there is no risk of impairment of software compatibility, which has been a problem in the conventional art, or an increase in the number of software keys due to processing for maintaining the desired compatibility.

In the user program mode, data in the user program area 10 of the VRAM is always updated in accordance with the operation of the CPU 17, although it is not displayed on the LCD 1, and there is no need to insert an unnecessary waiting period. It is therefore possible to maintain the desired compatibility without reducing the processing speed.

A mode change is made only when a stoppage of the output from the digitizer 2 occurs. This happens, for example, when movement of the pen 3 to a position remote from the digitizer 2 is detected. Therefore, switching of the switch 13 and the mode selection can be made without involution of data between the two modes.

Figure 4:
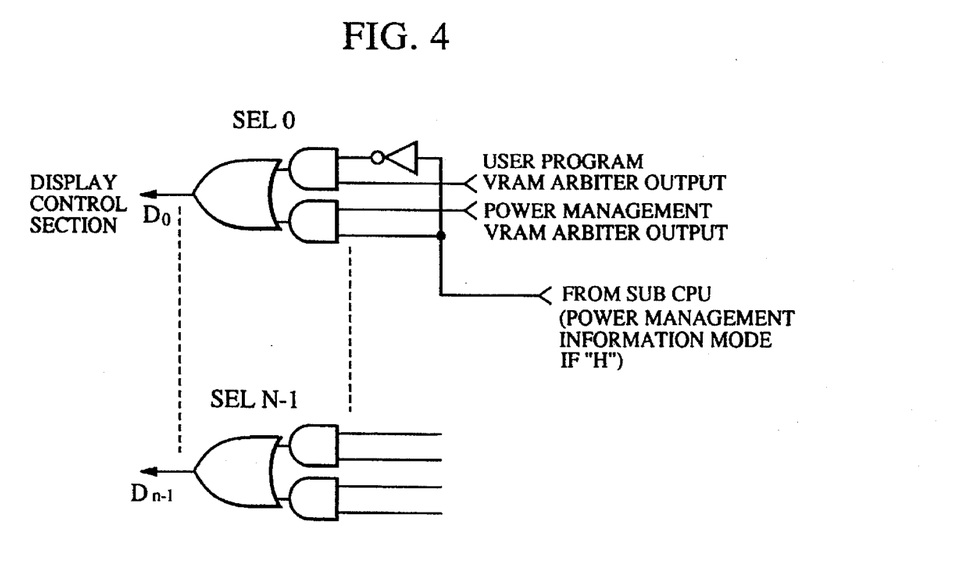
FIG. 4 is a block diagram of an example of the multiplexer shown in FIG. 1.

The multiplexer 6 of this embodiment is realized, for example, by inserting selectors SEL0 to SELN-1 with respect to data bits of outputs from the arbiters 7 and 8, as shown in FIG. 4.

[Second Embodiment]

Figure 5:
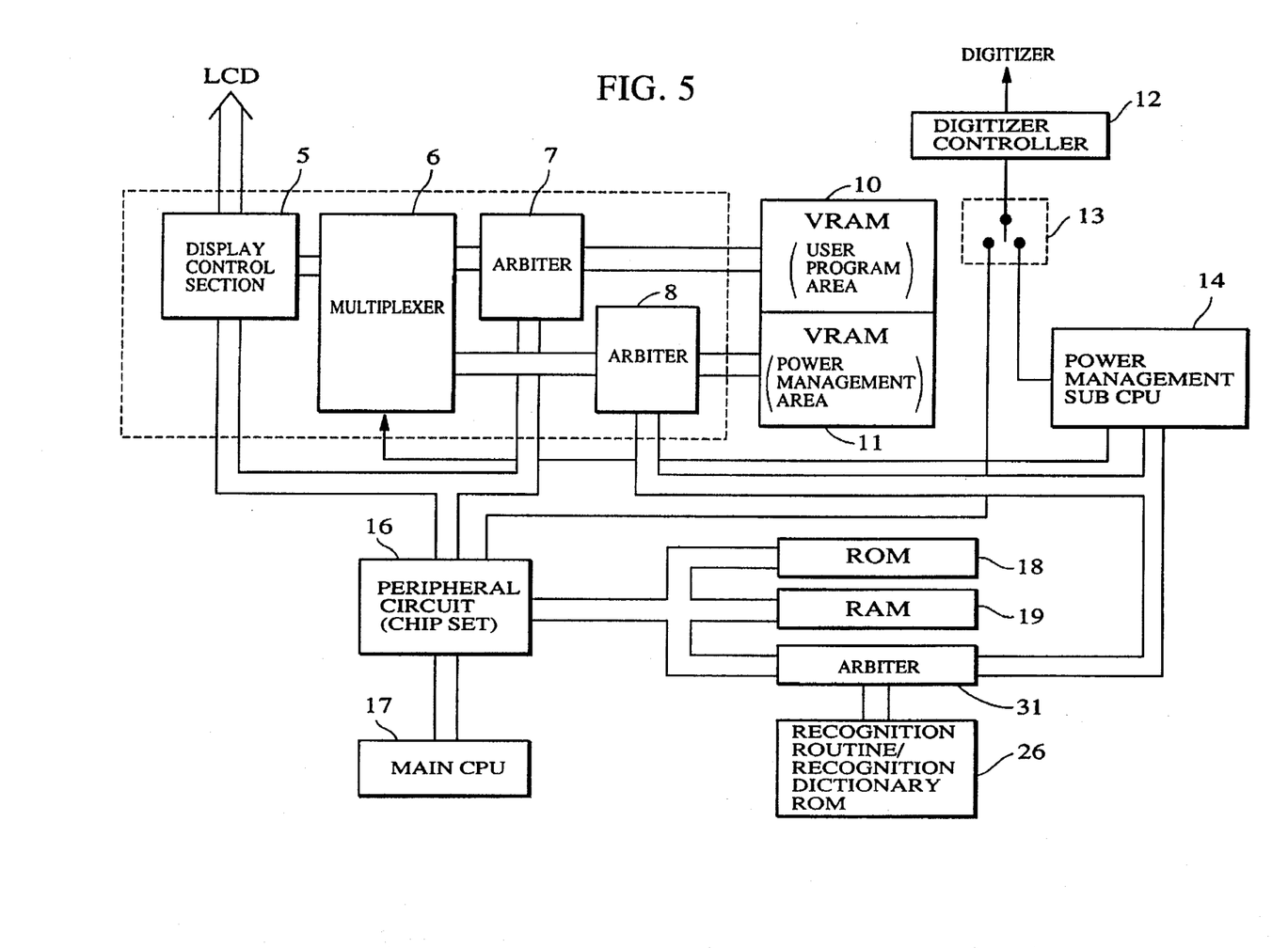
FIG. 5 is a block diagram of the construction of a portable pen-input computer apparatus in accordance with a second embodiment of the present invention.

FIG. 5 is a block diagram of the arrangement of a portable pen-input computer apparatus in accordance with a second embodiment of the present invention. Components of this embodiment identical or corresponding to those shown in FIG. 1 are indicated by the same reference characters.

In FIG. 5, a block 31 represents an arbiter which enables the content of the recognition routine/recognition dictionary ROM 26 to be accessed both from the power management sub CPU 14 and the main CPU 17 without any conflict.

Figure 6:
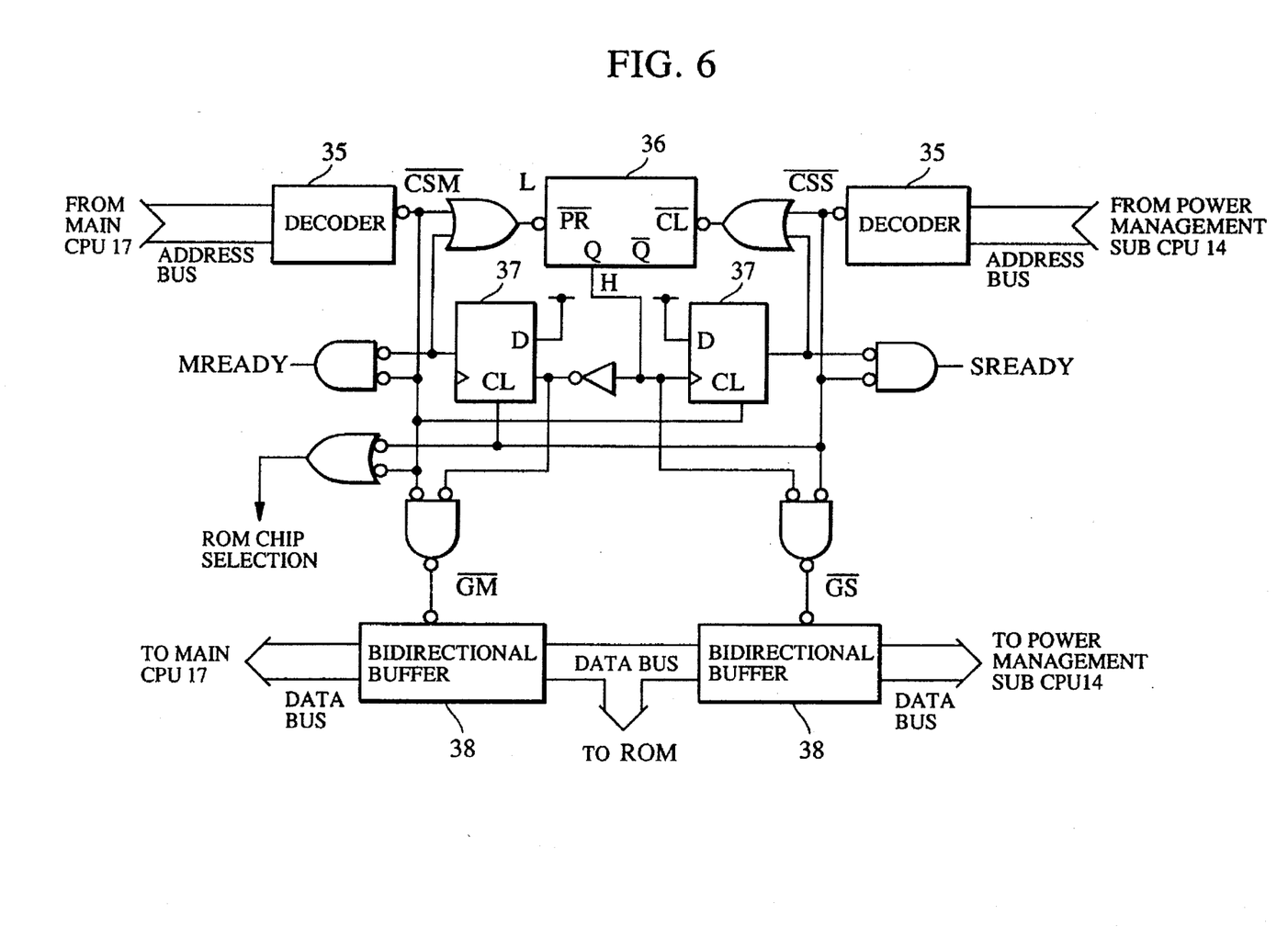
FIG. 6 is a block diagram of details of an arbiter shown in FIG. 5.

FIG. 6 is a block diagram of details of the configuration of the arbiter 31 shown in FIG. 5.

Figure 7:
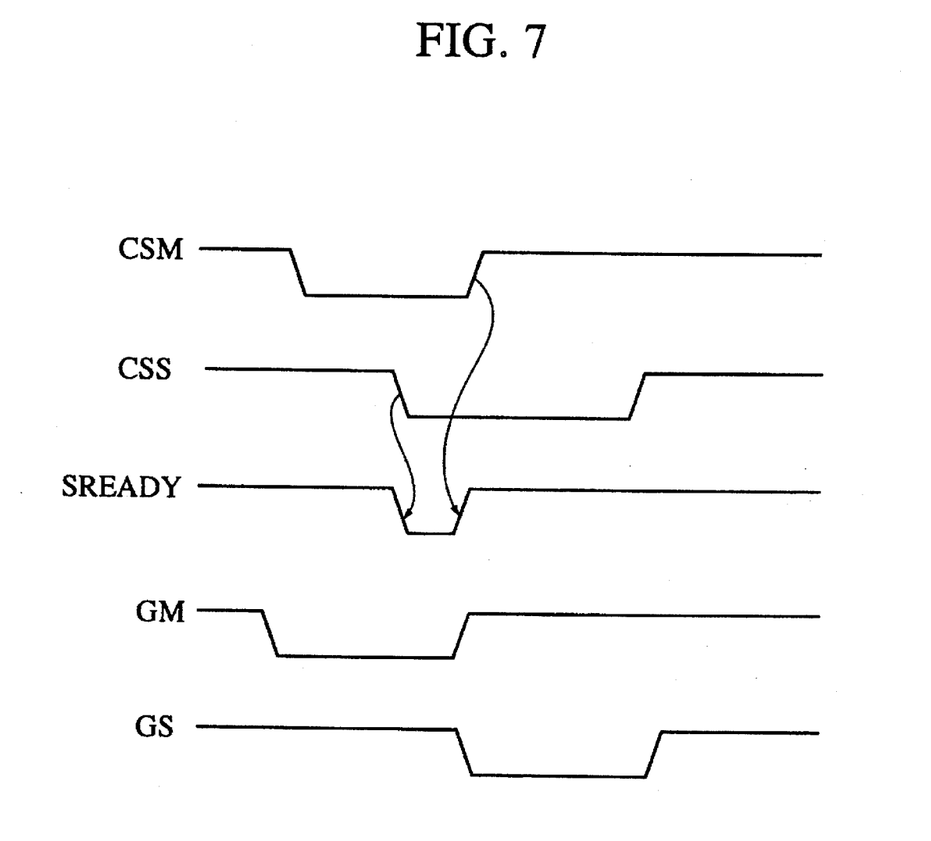
FIG. 7 is a timing chart of the operation of the portable pen-input computer apparatus shown in FIG. 5.

A block 35 represent address decoders which are supplied with addresses of the main CPU 17 and the sub CPU 14 and which generate chip select signals CSS to the ROM 26 shown in FIG. 5. A block 36 represents a flip flop which designates priority of an access to the ROM 18 (from the main CPU 17 if an output Q is high level, or from the sub CPU 14 if the output Q is low level). Blocks 37 represent D latches each of which latches a rise of an input. Block 38 represent bi-directional buffers for data buses to the ROM 18, the main CPU 17 and the sub CPU 14. FIG. 7 is a timing chart for explaining the operation of the portable pen-input computer apparatus shown in FIG. 5.

As shown in FIG. 7, if accesses from the main CPU 17 and the sub CPU 14 overlap each other, a ready signal READY, i.e., a ready signal SREADY or MREADY to one of the main and sub CPUs which has accessed the memory after the other is made inactive until the chip select signal from the other CPU that has accessed the memory antecedently is newly set to high level. The CPU having made the subsequent access is thereby set in a wait state and one of the bi-directional buffers 38 is selectively opened. In this manner, mutual interference between accesses from the two CPUs is prevented.

The apparatuses shown in FIGS. 1 and 5 are arranged so that the sub CPU 14 is required. However, the present invention can also be applied to an arrangement in which the operation of the sub CPU 14 is included, for example, in the operation of the chip set 16 or the main CPU 17.

[Third Embodiment]

Figure 8:
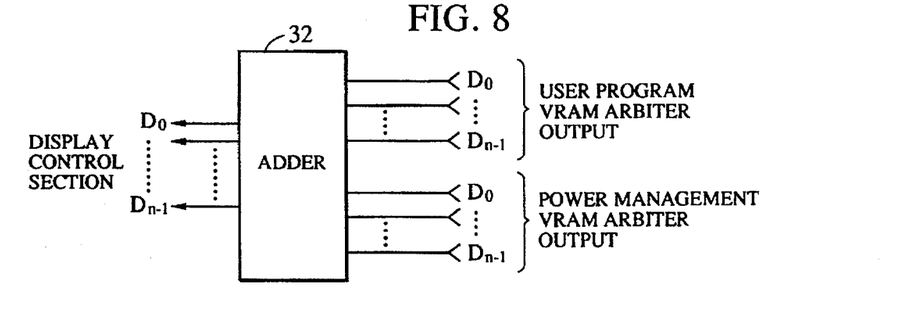
FIG. 8 is a block diagram of an example of the multiplexer shown in FIG. 5.

FIG. 8 is a block diagram of the arrangement of an essential portion of a portable pen-input computer apparatus in accordance with a third embodiment of the present invention. This apparatus is arranged in the same manner as that shown in FIG. 5 except that the multiplexer 6 shown in FIG. 5 is arranged to have a configuration such as that shown in FIG. 8.

Figure 9:
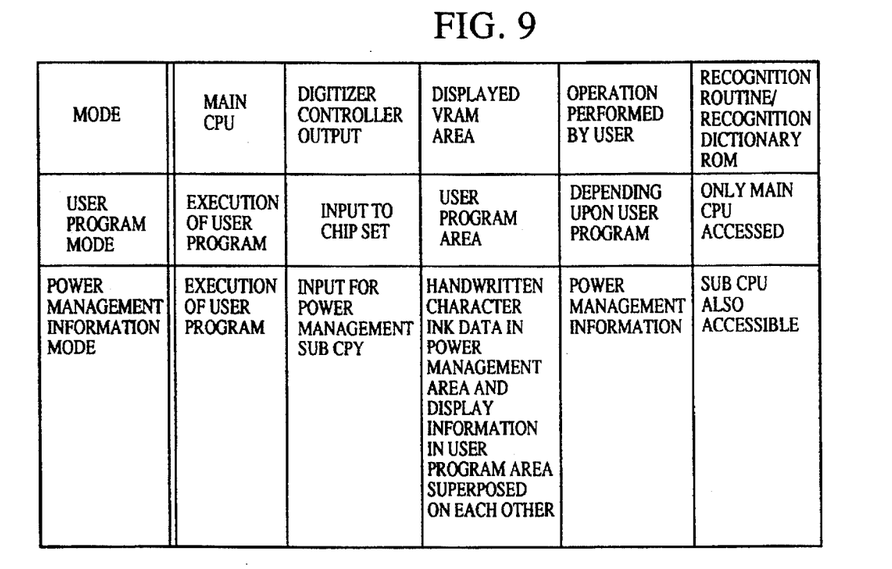
FIG. 9 is a diagram of operation modes of the portable pen-input computer apparatus shown in FIG. 5.

In FIG. 8, a block 32 represents an adder which has multiple data bits D0 to DN-1 corresponding to pixels in a 1:n (bit) relationship, and which is arranged to set a multiplicity of gradations or color tones for each pixel through n bits. In this arrangement, therefore, it is possible to display data in the power management area in a superposed state in the power management information input mode while maintaining an image display formed by a user program, as shown in FIG. 9.

Figure 10:
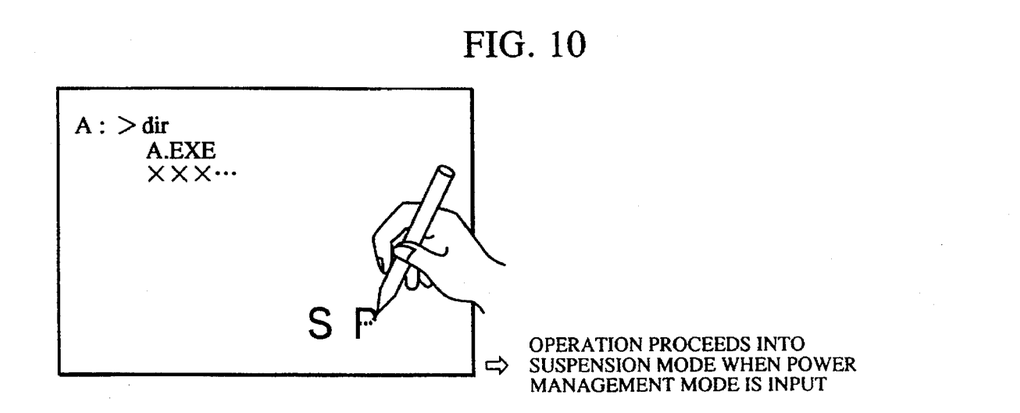
FIG. 10 is a diagram of a power management information input display window in the portable pen-input computer apparatus shown in FIG. 5.

In the power management information input mode shown in FIG. 10, ink data "SP" (data formed by directly plotting handwritten input data) is a group of data stored in the power management area of the VRAM, while other data is stored in the user program area. These groups of data are superposed by the adder 32.

The following processing can therefore be achieved.

Figure 11:
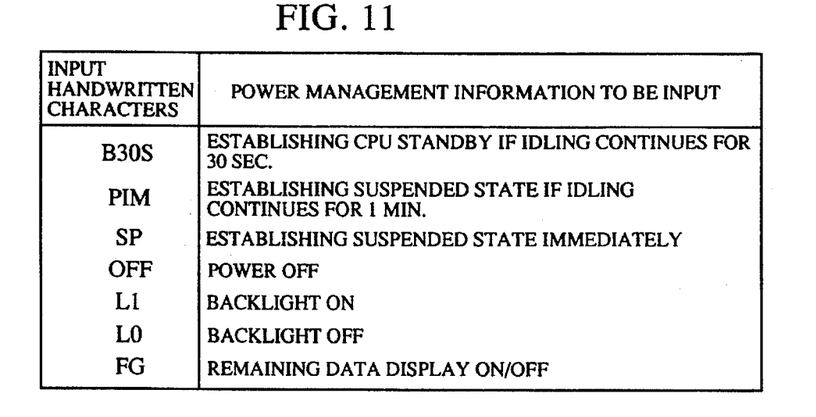
FIG. 11 is a diagram of the relationship between power management information and handwritten characters in the portable pen-input computer apparatus shown in FIG. 5.

That is, in a state where the power management information input mode is selected as an operation mode by operating the mode changeover switch 4 shown in FIG. 1, simple handwritten character codes such as those shown in FIG. 11 may be input to make the sub CPU 14 receive signal data from the digitizer 2 independently of the main CPU 17 and also access the recognition routine/recognition dictionary ROM 26 shown in FIG. 5 to recognize the handwritten character ink data in the digitizer signal and to perform necessary power management processing or update power management parameters. If the handwritten input characters are "SP", the operation proceeds into a suspended state.

In this case, the display may be observed as if the user input the handwritten codes into the image in the application window. Actually, however, no signal is transmitted from the digitizer 2 to the application program (user program), and no change is caused in the data in the user program area 10 of the VRAM. Therefore, the software compatibility of the user program is not impaired.

As in this embodiment, a very simple power management processing user interface can be realized which is capable of maintaining the desired software compatibility while the small-size and light-weight features and a low power consumption characteristic of the apparatus are maintained.

Only English alphabetical characters and Arabic numerals were selected as handwritten character codes shown in FIG. 11. However, handwritten characters used in accordance with the present invention may comprise gesture codes such as check marks and/or double-byte code characters such as Kanji.

In the above-described embodiments, the state of the switch 13 shown in FIG. 1 always has a correlation with the VRAM areas. However, such a correlation is not always required. For example, the result of detection of the amount of remaining battery energy or a reduction in power supply voltage can be easily displayed if the multiplexer 6 is formed of adder 32.

[Fourth Embodiment]

Figure 12:
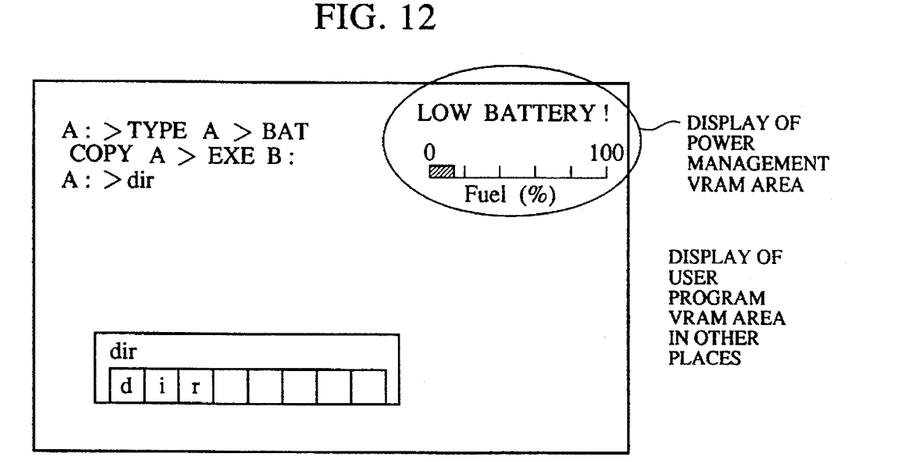
FIG. 12 is a diagram of an example of a power management display in a pen-input computer in accordance with a fourth embodiment of the present invention.

FIG. 12 shows an example of a power management display in a pen-input computer in accordance with a fourth embodiment of the present invention.

As shown in FIG. 12, the result of detection of the amount of remaining battery power and a reduction in power supply voltage can be displayed through the adder 32 by using the power management area 11.

The need for the light emitting diode indicator 30 necessary for displaying the power management state as in the conventional apparatus can therefore be eliminated. It is therefore possible to achieve reductions in the size, weight and power consumption of the system as well as to maintain the desired software compatibility.

[Fifth Embodiment]

Figure 13:
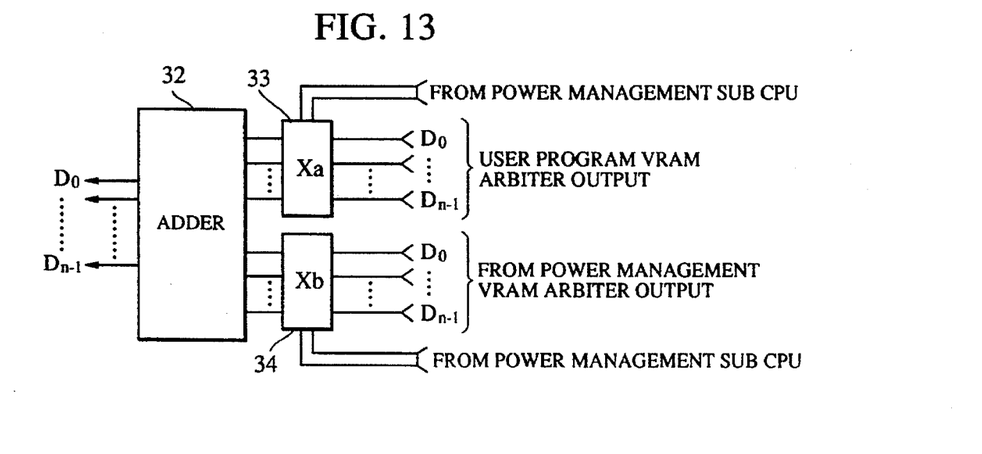
FIG. 13 is a block diagram of a multiplexer in a portable pen-input computer apparatus in accordance with a fifth embodiment of the present invention.

FIG. 13 is a block diagram of the configuration of a multiplexer in a portable pen-input computer apparatus in accordance with a fifth embodiment of the present invention.

In FIG. 13, blocks 33 and 34 respectively represent a multiplier for multiplying the output from the program VRAM arbiter 7 (having n-bit structure of DO to DN-1) by a constant a and a multiplier for multiplying the output from the power management VRAM arbiter 8 (having n-bit structure of DO to DN-1) by a constant b. The constants a and b can be changed by the power management sub CPU 14 shown in FIG. 1 if necessary.

It is therefore possible to perform, for example, processing shown below without performing troublesome processing, i.e., rewriting the contents in the user program area 10 and the power management area 11 of the VRAM.

(1) Lighting for "LOW BATTERY!" and "Fuel Gauge" of power management shown in FIG. 12 can be turned on and off or changed in color periodically to improve the effect of calling user's attention.

(2) During the period of time when the command "SP" can be input as shown in FIG. 10, the gradation of displayed data in the user program area is slightly reduced to achieve a visual display effect of highlighting "SP", thereby enabling the user to positively notice that the power management information input mode is selected.

Consequently, a user interface effective in preventing user's erroneous operation and failure to notice signs can be provided.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structure and functions.

What is claimed:

1. A portable computer apparatus comprising:
    designation means for designating one of a plurality of display modes, including a power management mode;
    execution means for executing an application program;
    power management execution means for performing power management by detecting power information and outputting a detection result independent of said execution means;
    first display information memory means for storing display information which is used for displaying a result of execution of the application program by said execution means; and
    second display information memory means for storing display information which is used for displaying the detection result output by said power management execution means,
    wherein said power management execution means performs control so that the content of said second display information memory means is displayed if the power management mode is designated by said designation means independent of the process of displaying the result of execution of the application program by said execution means.

2. A portable computer apparatus according to claim 1, said apparatus is driven by electric power supplied by a battery.

3. A portable computer apparatus comprising:
    designation means for designating one of a plurality of display modes, including a power management mode;
    execution means for executing an application program;

power management execution means for performing power management by detecting power information and outputting a detection result;

first display information memory means for storing display information which is used for displaying a result of execution of the application program by said execution means; and second display information memory means for storing display information which is used for displaying the detection result output by said power management execution means, wherein said power management execution means performs control so that the content of said second display information memory means is displayed if the power management mode is designated by said designation means while the application program is being executed by said execution means, and wherein said designation means comprises pen means.

4. A portable computer apparatus comprising:

designation means for designating one of a plurality of display modes, including a power management mode;

execution means for executing an application program;

power management execution means for performing power management by detecting power information and outputting a detection result;

first display information memory means for storing display information which is used for displaying a result of execution of the application program by said execution means;

second display information memory means for storing display information which is used for displaying the detection result output by said power management execution means; and display means for displaying information stored in said first and second display information memory means, wherein said power management execution means performs control so that the content of said second display information memory means is displayed if the power management mode is designated by said designation means while the application program is being executed by said execution means, and wherein said designation means comprises pen means.

5. A portable computer apparatus comprising:

designation means for designating one of a plurality of display modes, including a power management mode;

execution means for executing an application program;

power management execution means for performing power management by detecting power information and outputting a detection result;

first display information memory means for storing display information which is used for displaying a result of execution of the application program by said execution means;

second display information memory means for storing display information which is used for displaying the detection result output by said power management execution means; and display means for displaying information stored in said first and second display information memory means, wherein said power management execution means performs control so that the content of said second display information memory means is displayed if the power management mode is designated by said designation means while the application program is being executed by said execution means, wherein said designation means comprises pen means, and wherein said power management execution means causes the content of said first display information memory means and the content of said second display information memory means to be displayed on said display means by superposing the respective contents.

6. A portable computer apparatus comprising:

designation means for designating one of a plurality of display modes, including a power management mode;

execution means for executing an application program;

power management execution means for performing power management by detecting power information and outputting a detection result;

first display information memory means for storing display information which is used for displaying a result of execution of the application program by said execution means;

second display information memory means for storing display information which is used for displaying the detection result output by said power management execution means; and display means for displaying information stored in said first and second display information memory means, wherein said power management execution means performs control so that the content of said second display information memory means is displayed if the power management mode is designated by said designation means while the application program is being executed by said execution means, wherein said designation means comprises pen means, and wherein said power management execution means causes said display means to alternately display the content of said first display information memory means and the content of said second display information memory means.

7. A portable computer apparatus comprising:

input means for inputting commands;

display mode designation means for designating one of a plurality of display modes, including a power management mode;

program execution means for performing each command input by said input means;

power management execution means for performing power management by detecting power information and outputting a detection result;

first display information memory means for storing display information which is used for displaying a result of execution of an application program by said program execution means;

second display information memory means for storing display information which is used for displaying the detection result output by said power management execution means, wherein said program execution means executes the application program and said power management execution means performs power management processing by accessing a recognition routine/recognition dictionary based on a command input by said input means, if the power management mode is designated by said display mode designation means while a user program is being executed by said program execution means.

8. A portable computer apparatus according to claim 7, wherein said input means comprises pen means.

9. A portable computer apparatus according to claim 8, further comprising display means for displaying the display information stored in said first and second display information memory means, wherein said display means drives, by electric power, a touch panel constructed integrally with detection means for detecting coordinates designated with said pen means.

10. A portable computer apparatus according to claim 9, wherein said power management execution means causes said display means to display the content of said first display information memory means and the content of said second display information memory means by superposing the respective contents.

11. A portable computer apparatus according to claim 9, wherein said power management execution means causes said display means to alternatively display the content of said first display information memory means and the content of said second display information memory means.

12. A portable computer apparatus according to claim 7, wherein electric power for said apparatus is supplied by a battery.

13. A method of controlling a display in a portable computer apparatus capable of performing power management and having designation means for designating one of a plurality of display modes, including a power management mode, said method comprising the steps of:

executing an application program;

storing a result of the execution of the application program in a first memory;

performing power management by detecting power information regarding the portable computer apparatus and outputting a detection result;

storing information relating to the detection result output at said power management step in a second memory; and displaying information stored in the first memory and information stored in the second memory, if the power management mode is designated by the designation means, during the execution of the application program.

14. A method of controlling a display in a portable computer apparatus capable of performing power management and having designation means for designating one of a plurality of display modes including a power management mode, said method comprising the steps of:

inputting commands to be processed in an application program;

performing each command input at said inputting step;

storing a result of the execution of the application program in a first memory;

performing power management by detecting power information regarding the portable computer apparatus and outputting a detection result;

storing information relating to the detection result of the power management step in a second memory; and executing the application program and performing power management processing by accessing a recognition routine/recognition dictionary based on an input command, if the power management mode is designated by the designation means during the execution of the user program.

15. A portable computer apparatus comprising:

execution means for executing an application program;

power management execution means for performing power management by detecting power information independent of said execution means; and designation means for designating a display of power management information obtained by said power management execution means, wherein said power management execution means performs control so that the power management information is displayed if the display of the power management information is designated by said designation means independent of a process of displaying a result of execution of the application program by said execution means.

* * * * *

UNITED STATES PATENT AND TRADEMARK OFFICE
CERTIFICATE OF CORRECTION

PATENT NO.  : 5,640,574

DATED       : June 17, 1997

INVENTOR(S) : TOSHIHIKO KAWASHIMA

It is certified that error appears in the above-identified patent and that said Letters Patent is hereby corrected as shown below:

COLUMN 10
Line 62, "said" should read --wherein said--.

Signed and Sealed this

Thirtieth Day of December, 1997

Attest:

BRUCE LEHMAN

Attesting Officer   Commissioner of Patents and Trademarks